(12) United States Patent
Campbell et al.

(10) Patent No.: US 6,560,418 B2
(45) Date of Patent: May 6, 2003

(54) METHOD OF SETTING LASER POWER AND DEVELOPER BIAS IN A MULTI-COLOR ELECTROPHOTOGRAPHIC MACHINIE

(75) Inventors: Alan Stirling Campbell, Lexington, KY (US); Gary Allen Denton, Lexington, KY (US); Stanley Coy Tungate, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/802,564

(22) Filed: Mar. 9, 2001

(65) Prior Publication Data

US 2002/0181964 A1 Dec. 5, 2002

(51) Int. Cl.[7] ............................................. G03G 15/00
(52) U.S. Cl. .......................................... 399/49; 399/46
(58) Field of Search .............................. 399/46, 49, 50, 399/51, 72, 302

(56) References Cited

U.S. PATENT DOCUMENTS

| 4,572,654 A | | 2/1986 | Murai et al. |
|---|---|---|---|
| 4,647,184 A | | 3/1987 | Russell et al. |
| 4,816,863 A | | 3/1989 | Lee |
| 4,829,336 A | | 5/1989 | Champion et al. |
| 4,878,082 A | | 10/1989 | Matsushita et al. |
| 4,951,088 A | * | 8/1990 | Bonvallet et al. .............. 399/60 |
| 4,970,536 A | | 11/1990 | Haneda et al. |
| 4,999,673 A | | 3/1991 | Bares |
| 5,103,260 A | | 4/1992 | Tompkins et al. |
| 5,148,217 A | | 9/1992 | Almeter et al. |
| 5,148,289 A | | 9/1992 | Nishiyama et al. |
| 5,157,441 A | | 10/1992 | Scheuer et al. |
| 5,162,874 A | | 11/1992 | Butler |
| 5,200,783 A | * | 4/1993 | Maeda et al. ................ 118/665 |
| 5,227,270 A | | 7/1993 | Scheuer et al. |
| 5,227,842 A | | 7/1993 | Hayashi et al. |
| 5,250,988 A | | 10/1993 | Matsuura et al. |
| 5,253,018 A | | 10/1993 | Takeuchi et al. |
| 5,277,842 A | | 1/1994 | Wittekind et al. |
| 5,298,944 A | | 3/1994 | Sawayama et al. |
| 5,315,351 A | | 5/1994 | Matsushiro et al. |
| 5,386,276 A | | 1/1995 | Swales et al. |
| 5,461,462 A | | 10/1995 | Nakane et al. |
| 5,486,901 A | | 1/1996 | Fukuchi et al. |
| 5,502,550 A | | 3/1996 | Hori et al. |
| 5,512,986 A | | 4/1996 | Toyomura et al. |
| 5,521,677 A | | 5/1996 | Brewington et al. |
| 5,543,896 A | | 8/1996 | Mestha |
| 5,559,579 A | | 9/1996 | Gwaltney et al. |
| 5,568,234 A | | 10/1996 | Shiba |
| 5,574,544 A | | 11/1996 | Yoshino et al. |
| 5,583,644 A | | 12/1996 | Sasanuma et al. |
| 5,600,407 A | | 2/1997 | Kasiske et al. |
| 5,666,588 A | | 9/1997 | Uchiyama et al. |
| 5,694,223 A | | 12/1997 | Katori et al. |
| 5,710,958 A | | 1/1998 | Raj |
| 5,722,007 A | | 2/1998 | Ogata et al. |

(List continued on next page.)

*Primary Examiner*—Joan Pendegrass
(74) *Attorney, Agent, or Firm*—John A. Brady; John J. McArdle; Ronald K. Aust

(57) ABSTRACT

A method of calibrating a multi-color electrophotographic machine having an image bearing surface includes forming toner patches of cyan, magenta, and yellow solid areas individually and in superimposed combination to form a series of single layer and multi-layer test patches. Light is emitted onto these single and multi-layer test patches. The amount of light that is reflected off of each test patch is measured. Light is also emitted onto a bare section of the image-bearing surface. The bare section has substantially no toner thereon. An amount of light that is reflected off of the bare section is measured. The step of measuring an amount of light reflected off single layer solid area test patches is repeated for a series of laser power and developer bias conditions. A laser power and/or a developer bias is adjusted dependent upon each of the three measuring steps.

31 Claims, 6 Drawing Sheets

U.S. PATENT DOCUMENTS

| | | | |
|---|---|---|---|
| 5,748,330 | A | 5/1998 | Wang et al. |
| 5,748,857 | A | 5/1998 | Nakamura et al. |
| 5,777,656 | A | 7/1998 | Henderson |
| 5,784,667 | A | 7/1998 | Mestha et al. |
| 5,797,064 | A | 8/1998 | Raj et al. |
| 5,819,132 | A | 10/1998 | Hirobe |
| 5,826,079 | A | 10/1998 | Boland et al. |
| 5,873,011 | A | 2/1999 | Takemoto et al. |
| 5,895,141 | A | 4/1999 | Budnik et al. |
| 5,903,796 | A | 5/1999 | Budnik et al. |
| 5,933,680 | A | 8/1999 | Nishimura |
| 5,937,229 | A | 8/1999 | Walgrove et al. |
| 5,953,554 | A | 9/1999 | Ohnishi et al. |
| 5,960,228 | A * | 9/1999 | Budnik et al. ............... 399/34 |
| 5,974,276 | A | 10/1999 | Oogi |
| 5,987,271 | A | 11/1999 | Regelberger et al. |
| 5,987,272 | A | 11/1999 | Maeda et al. |
| 5,991,558 | A | 11/1999 | Emi et al. |
| 5,995,248 | A | 11/1999 | Katori et al. |
| 6,064,848 | A | 5/2000 | Haneda |
| 6,072,512 | A | 6/2000 | Fukasawa |
| 6,078,401 | A | 6/2000 | Kanamori |
| 6,121,986 | A | 9/2000 | Regelsberger et al. |
| 6,125,245 | A | 9/2000 | Shibuya et al. |
| 6,147,698 | A | 11/2000 | Zable et al. |
| 6,181,888 | B1 | 1/2001 | Scheuer et al. |
| 6,181,892 | B1 | 1/2001 | Fujimori |
| 6,185,386 | B1 | 2/2001 | Noguchi |

* cited by examiner

METHOD OF SETTING LASER POWER AND DEVELOPER BIAS IN A MULTI-COLOR ELECTROPHOTOGRAPHIC MACHINE

BACKGROUND OF THE INVENTION

1. Field of the Invention

The present invention relates to multi-color electrophotographic machines, and, more particularly, to setting laser power and developer bias in multi-color electrophotographic machines.

2. Description of the Related Art

Toner patch sensors reflect light off of a toner patch to determine how much toner was laid down during the electrophotographic process. The sensor's voltage signal from reading a toner patch is compared to the sensor signal from reading a bare surface to produce either a voltage difference or a ratio between the two signals. In either case, when the reflectivity of the bare surface changes due to wear or toner filming, the accuracy of the toner patch sensor's estimates of toner mass per unit area or fused image density is compromised. Toner patch sensors need a reference reflectivity surface to maintain the sensor calibration. Without such a surface, changes in the reflectivity of the intermediate belt or photoconductive drum will corrupt the accuracy of the patch sensor.

Toner patch sensors are used in printers and copiers to monitor the toner density of unfused images and provide a means of controlling the print darkness. In color printers and copiers, the toner patch sensors are used to maintain the color balance and in some cases to modify the gamma correction or halftone linearization as the electrophotographic process changes with the environment and aging effects. Conventional reflection based toner sensors use a single light source to illuminate a test patch of toner and one or more photosensitive devices to detect the reflected light. In most cases the densities of the toner patches are sensed on the photoconductor. Sensing toner patches on photoconductor drums, in a tandem architecture, however, can be an unattractive option since it requires four sensors (one for each photoconductive drum) and there is often little room for such sensors.

Laser power and developer bias operating points that are used in a toner saver mode produce prints which use less toner per page in order to reduce the cost of the printed page. This savings in toner is accompanied by a loss of print quality which is acceptable to some customers. On monochrome laser printers, the toner saver mode operating points can be established by testing and stored in the printer engine code as fixed values when the printer is manufactured. The toner saver operating points depend on the printer model, the cartridge type and the environment. There has been considerable variability in toner savings for a given setting due to variability in cartridges, laser printheads, and environments.

What is needed in the art is a method of compensating for the changes in the reflectivity of the intermediate belt due to wear and toner filming, and which allows the halftone screens to be accurately linearized based on the patch sensor readings.

SUMMARY OF THE INVENTION

The present invention provides a method of compensating for changing substrate reflectivity based upon reading a series of special test patches formed by single solid area layers of cyan, magenta, and yellow toners, and test patches formed by superimposing combinations of these patches.

The invention comprises, in one form thereof, a method of calibrating a multi-color electrophotographic machine having an image-bearing surface. Toner patches of cyan, magenta, and yellow solid areas are formed individually and in superimposed combination to form a series of single layer and multi-layer test patches. Light is emitted onto these single and multi-layer test patches. The amount of light that is reflected off of each test patch is measured. Light is also emitted onto a bare section of the image-bearing surface. The bare section has substantially no toner thereon. An amount of light that is reflected off of the bare section is measured. The step of measuring an amount of light reflected off single layer solid area test patches is repeated for a series of laser power and developer bias conditions. A laser power and/or a developer bias is adjusted dependent upon each of the three measuring steps.

Black toner patches become effectively saturated at target densities on the intermediate belt. Saturation occurs when the intermediate belt reflectivity is less than 10–20%. By measuring lower density patches, one can more accurately predict the electrophotographic settings needed to achieve the target density. The reflection data from lower density patches is fit to an exponential form and extrapolated image densities at higher darkness settings are used to select the electrophotographic operating condition.

An advantage of the present invention is that operating points for toner saver modes are calculated with more accuracy due to the closed loop control provided by the toner patch sensor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
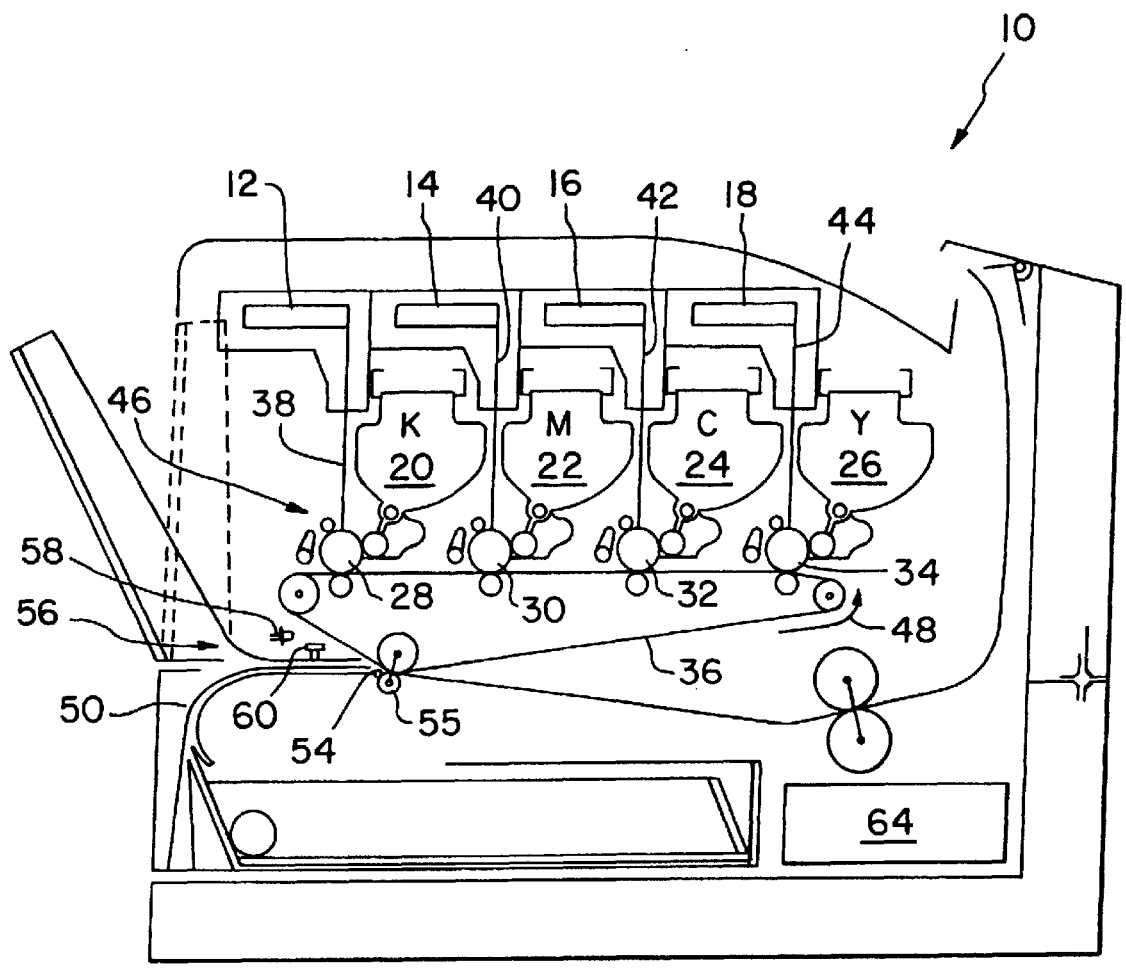
FIG. 1 is a side sectional view of a multicolor laser printer which can be used in conjunction with the method of the present invention.

Referring now to the drawings and, more particularly, to FIG. 1, there is shown one embodiment of a multicolor laser printer 10 including laser printheads 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printheads 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −300 volts in the areas of its peripheral surface that are impinged by a respective one of laser beams 38, 40, 42 and 44 to form a latent image thereon made up of a plurality of dots, or pels. The photoconductive drum discharge is limited to about −200 volts because the conductive core is biased at −200 volts to repel toner at the beginning of printing when the photoconductive surface touching the developer roll has not yet been charged to −900 volts by the charge roll. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

A thin layer of negatively charged toner is formed on the developer rolls in cartridges 20, 22, 24 and 26 by means known to those skilled in the art. The developer roll is biased to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −300 volts by the laser beams. As belt 36 rotates in the direction indicated by arrow 48, the toner from each of drums 28, 30, 32 and 34 is transferred to the outside surface of belt 36. As a print medium, such as paper, travels along path 50, the toner is transferred to the surface of the print medium in nip 54. Transfer to paper is accomplished by using a positively biased transfer roll 55 below the paper in nip 54.

Figure 2:
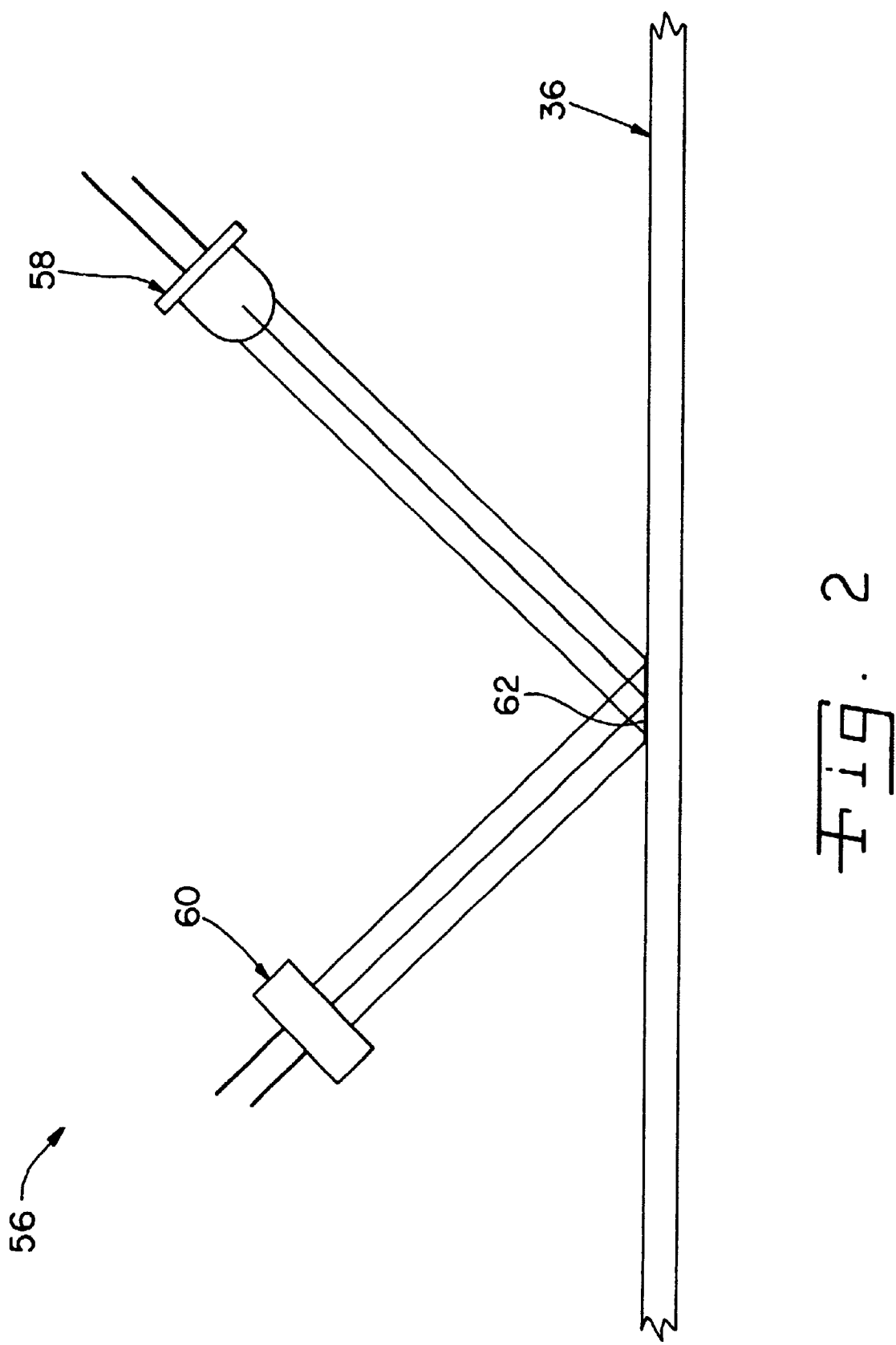
FIG. 2 is a side, schematic side view of the sensor arrangement of FIG. 1.

A sensor arrangement 56 includes a light source 58 and a light detector 60. Since belts are prone to warp and flutter as they move between rollers, sensor arrangement 56 can be located opposite a roller to stabilize the distance between sensor arrangement 56 and belt 36. Light source 58 illuminates a toner test patch 62 (FIG. 2) on intermediate belt 36. The light reflecting off of toner patch 62 is sensed by light detector 60.

Test patch 62 is formed by superimposing solid area patches of cyan, magenta, and yellow toner on intermediate belt 36. These unfused toners are all fairly reflective at 880 nm, the wavelength used by toner patch sensor arrangement 56. Each of the toner layers is formed using near maximum laser power and developer bias settings so as to produce substantial toner densities on the magenta, cyan and yellow photoconductive drums 30, 32 and 34, respectively. When multilayer patch 62 is to be read by patch sensor 56, the gain setting of toner patch sensor 56 is reduced by a factor of two from its normal color toner gain to avoid clipping. Otherwise, the signal level might exceed the dynamic range of the patch sensor circuitry. This signal is compared to a bare belt reading to produce a cyan, magenta, yellow (CMY) reflection ratio. A reflection ratio (RR) is the ratio of the voltage signal with toner to the bare belt voltage signal from patch sensor 56. The gain level is assumed to be the same for both measurements. Best results are obtained by comparing the toner patch signal to the bare belt signal for the same location on belt 36. An engine controller 64 records the CMY reflection ratio when a new intermediate transfer belt 36 is installed and the nominal reflectivity of the new intermediate transfer belt 36 is known. During subsequent calibration operations, the CMY reflection ratio is measured and compared to the original CMY reflection ratio. If the ratio decreases by 10%, then this is taken as an indication that the bare belt reflectivity has increased by 10%. The CMY reflection ratio, RRcmy, is used to better interpret the reflection ratio (RR) of the single color toner patches.

The density of a single color toner patch can be compared to the dynamic range for patches of that color toner. The dynamic range is taken to be the signal difference, Vsat−Vbare, between a bare belt and a saturated toner patch. A saturated toner patch is a toner patch with a reflectivity equal to that of a thick layer of toner powder whose reflectivity is independent of the underlying substrate.

The image density is taken to be a monotonic function, D(x) where $$x = \frac{Vtoner - Vbare}{Vsat - Vbare}.$$

Dividing all terms by Vbare, we get $$x = \frac{RR - 1}{RRsat - 1}.$$

The saturated patch signals for each toner can be replaced with a common overlay patch signal, RRcmy. If the overlay patch is thick enough, then the voltage reading obtained from that patch, Vcmy, will be independent of the belt reflectivity. Since a saturated patch voltage is by definition independent of the bare belt reflectivity, $$\frac{Vsat}{Vbare} \propto \frac{Vcmy}{Vbare}$$

and RRcmy RRsat. For a given toner, such as cyan, there will be an experimentally determined constant, $$K_c = \frac{RRsat}{RRcmy},$$

where RRsat is the saturation reflection ratio for cyan toner. This constant is not dependent on the belt reflectivity, but depends only on the reflective properties of the cyan toner at the patch sensor wavelength. By simple substitution, we can express the anticipated fused image density on paper for cyan as a monotonic function of the parameter $$x = \frac{RR - 1}{K_c \times RRcmy - 1}.$$

Figure 3:
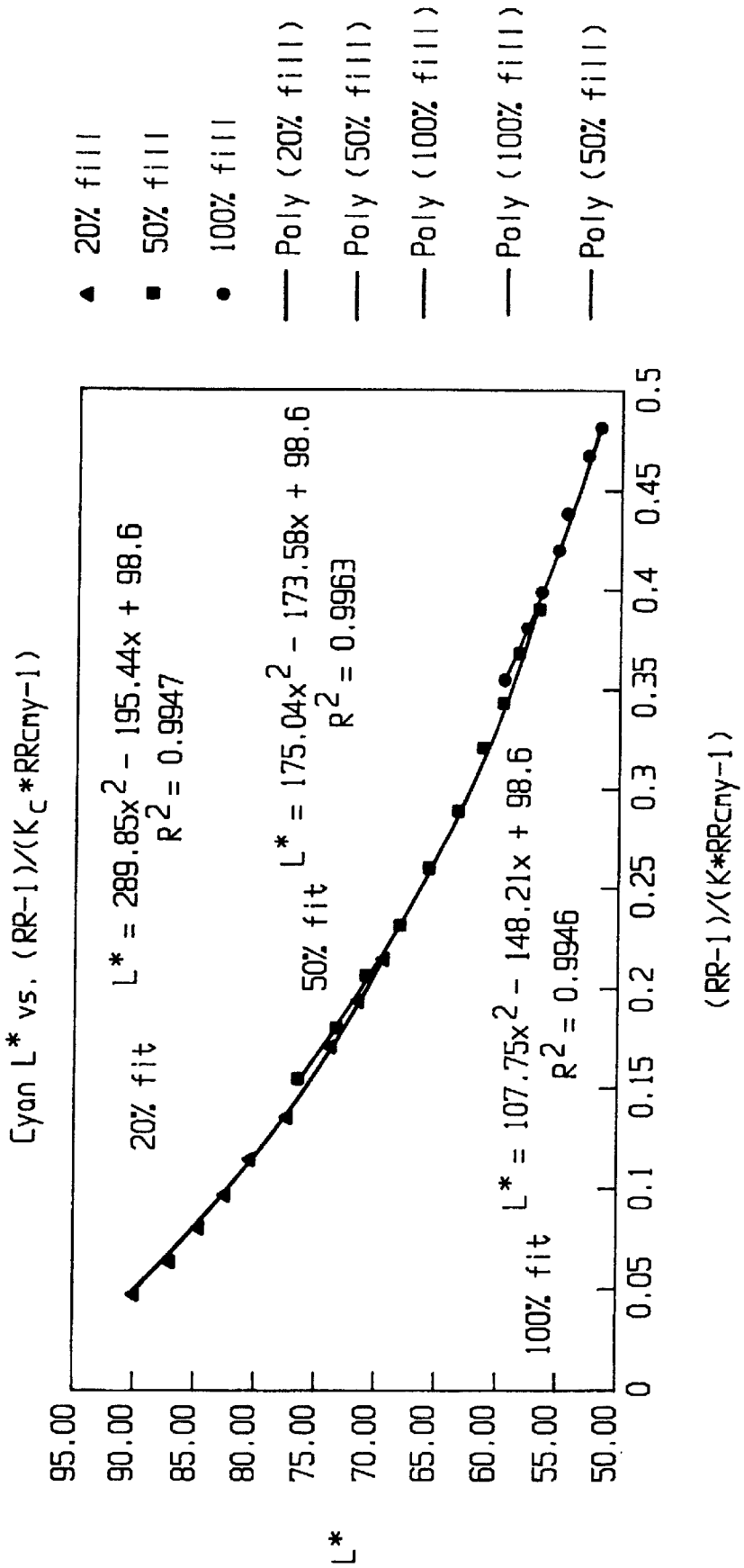
FIG. 3 is a plot of cyan L* versus (RR−1)/($K_c$*RRcmy−1) for three different halftone patterns

Experiments have shown that the relationship between the measured cyan density and the cyan reflection ratio can be well represented by quadratic equations. FIG. 3 shows data for three different halftone patterns: 20% fill, 50% fill, and a solid area fill. A range of image densities was produced by repeatedly incrementing the developer bias and the laser power together. Experiments have shown that different halftone patterns produce similar but distinctly different correlations between the RR signals and the fused image densities. That is why the halftone data in FIG. 3 have different coefficients for the different area coverages. In this chart, a RRcmy value of 18 was used, based upon initial experiments with CMY overlay patches. The Kc constant was not directly measured in this example, and its value was simply estimated as 1. The constant Kc can be measured by forming an overlay patch using four cartridges of the same color.

If the maximum toner densities that can be laid down by the cyan, magenta, and yellow cartridges are not thick enough to make RRcmy independent of the belt reflectivity, then the scheme outlined above to compensate for changes in the intermediate transfer belt reflectivity will be imperfect. Based on experiments with CMY overlay patches using three and four color toner cartridges in the printer, the CMY overlay reflection ratio can be estimated to be greater than 90% of the saturated RRcmy ratio value. Thus, the error incurred in using a CMY overlay patch is probably less than 10% for calculations of the parameter $$x = \frac{RR - 1}{K_c \times RRcmy - 1}.$$

The changing belt reflectivity over belt life may produce a small change in the constant $K_c$, which is used to estimate RRsat from RRcmy. One way to compensate for this change would be to use a lookup table or equation that estimates the expected values of $K_c$, over belt life.

Another method would be to measure the reflection ratios of the following toner patches: yellow, cyan, magenta, cyan over yellow, magenta over cyan, and magenta over cyan over yellow. These reflection ratios can then be used to estimate the saturated reflection ratios for each color toner. In this embodiment, light source 58 emits infrared light at 880 nm onto a bare belt 36 at predetermined toner patch locations, and the amplified voltage signal from light detector 60 is measured. The voltage of light detector 60 is also measured for the following six toner patches: yellow; cyan; magenta; cyan over yellow; magenta over cyan; and magenta over cyan over yellow. Reflection ratios are computed for each patch by dividing the light detector voltage for each patch by the light detector voltage for bare belt 36.

The following reflectivity model is used to estimate the belt reflectivity:

$R_{patch} = R_{powder}(1 - e^{-S*M}) + R_{substrate}(e^{-S*M})$, wherein
Yellow patch reflectivity $R_y = R_{max\_y}(1 - e^{-Sy*My}) + R_{belt}(e^{-Sy*My})$
Cyan patch reflectivity $R_c = R_{max\_c}(1 - e^{-Sc*Mc}) + R_{belt}(e^{-Sc*Mc})$
Magenta patch reflectivity $R_m = R_{max\_m}(1 - e^{-Sm*Mm}) + R_{belt}(e^{-Sm*Mm})$
Yellow underlayer mass density $M_{yu} = M_y + \delta y$
Cyan underlayer mass density $M_{cu} = M_c + \delta c$
Yellow underlayer reflectivity $R_{yu} = R_{max\_y}(1 - e^{-Sy*Myu}) + R_{belt}(e^{-Sy*Myu})$
Cyan over Yellow reflectivity $R_{cy} = R_{max\_c}(1 - e^{-Sc*Mc}) + R_{yu}(e^{-Sc*Mc})$
Cyan underlayer reflectivity $R_{cu} = R_{max\_c}(1 - e^{-Sc*Mcu}) + R_{belt}(e^{-Sc*Mcu})$
Magenta over cyan reflectivity $R_{mc} = R_{max\_m}(1 - e^{-Sm*Mm}) + R_{cu}(e^{-Sm*Mm})$
Cyan-yellow underlayer reflectivity $R_{cuyu} = R_{max\_c}(1 - e^{-Sc*Mcu}) + R_{yu}(e^{-Sc*Mcu})$
Magenta-cyan-yellow reflectivity $R_{mcy} = R_{max\_m}(1 - e^{-Sm*Mm}) + R_{cuyu}(e^{-Sm*Mm})$ and wherein the following are unknown model parameters:
Yellow toner patch density (mg/cm$^2$)=$M_y$
Cyan toner patch density=$M_c$
Magenta toner patch density=$M_m$
Belt reflectivity=$R_{belt}$ And wherein the following are experimental constants:
Reflectivity of Yellow toner at 880 nm=$R_{max\_y}$
Reflectivity of Cyan toner at 880 nm=$R_{max\_c}$
Reflectivity of Magenta toner at 880 nm=$R_{max\_m}$
Reflectivity of Black toner at 880 nm=$R_{max\_k}$
Yellow hiding power coefficient $S_Y$
Cyan hiding power coefficient $S_C$
Magenta hiding power coefficient $S_M$
Yellow mass density increase when covered by Cyan (mg/cm$^2$)=$\delta y$
Cyan mass density increase when under Magenta=$\delta c$
Quadratic and linear coefficients for estimating voltage from reflectivity.

The yellow toner patch loses mass to the subsequent photoconductor drums when it contacts them unless those drums have toner patches, which overlay the yellow patch. This mass loss is sometimes referred to as back-transfer. Cyan and magenta toner patches suffer similar mass losses when they are contacted by the other photoconductor drums.

Figure 4:
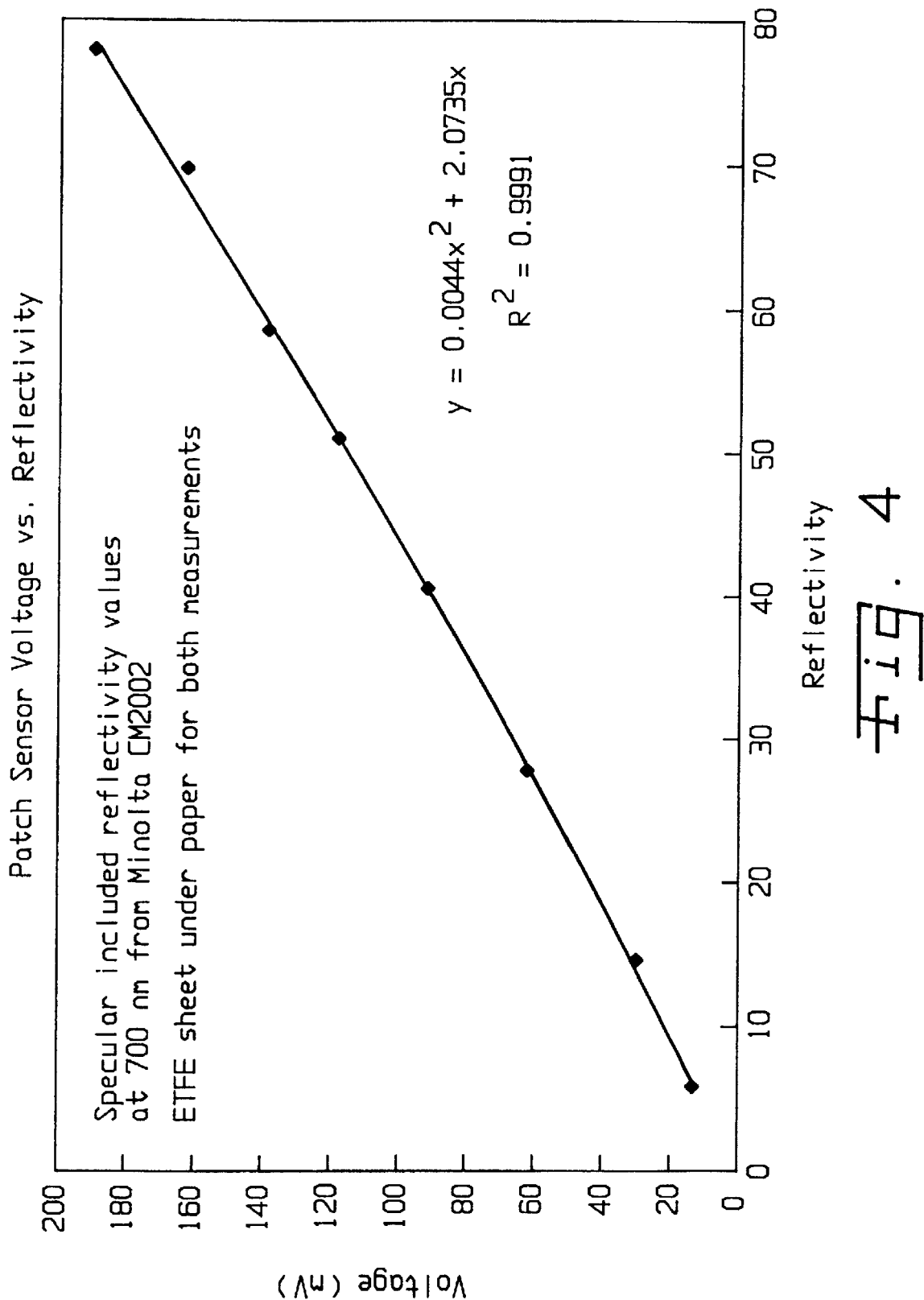
FIG. 4 is a plot of patch sensor voltage versus reflectivity.

A ratio of patch sensor voltages is calculated by the equation:

$$RR = \frac{V_{patch}}{V_{bare}} = \frac{(a \times R_{patch} + b \times R_{patch}^2)}{(a \times R_{belt} + b \times R_{belt}^2)},$$

wherein a and b are constants which are empirically derived by sensing multiple areas with known reflectivity. FIG. 4 shows data characteristic of a sensor with an integrating collection geometry. Such a sensor is more fully described in co-pending application, Ser. No. 09/704,133, entitled "Toner Patch Sensing with Integrating Optical Collection Geometry", the contents of which are herein expressly incorporated by reference.

An error function is given by:

$$\chi = \Sigma(RR_{model} - RR_{measured})^2.$$

The belt reflectivity is determined by a regression procedure in which a four-dimensional grid of test points ($M_y$, $M_c$, $M_m$, $R_{belt}$) is defined. The error $\chi$ is evaluated at each test point. The test point with the lowest value of $\chi$ is selected. The grid is re-centered around the selected test point with tighter grid spacing. The above-described error evaluation, test point selection and grid re-centering is repeated until the grid spacing is less than the desired accuracy. The belt reflectivity $R_{belt}$ is taken to be the value that gave the lowest value of $\chi$.

Maximum/asymptotic reflection ratios are estimated by the equation:

$$RRsat = \frac{V_{max}}{V_{bare}} = \frac{(a \times R_{max} + b \times R_{max}^2)}{(a \times R_{belt} + b \times R_{belt}^2)},$$

where $R_{max}$ is the measured bulk reflectivity of each toner powder at 880 nm.

In the color calibration procedure, after the overlay patches have been analyzed, the belt reflectivity has been estimated, and the saturated reflection ratios have been estimated, a series of six progressively darker solid area test patches are laid down on intermediate transfer belt 36 and sensed with toner patch sensor 56. When these patches are being formed on photoconductive drums 28, 30, 32 and 34, the laser power and developer bias settings are incremented together in a regular manner. Each color cartridge may have unique starting values and step sizes for the laser power (Lpow) and developer bias (Dev_pwm). The table below gives representative values for cyan.

| Darkness setting | Lpow | Dev_pwm | computed L* |
|---|---|---|---|
| 1.0 | 40 | 170 | 66 |
| 2.0 | 45 | 177 | 62 |
| 3.0 | 50 | 184 | 59 |
| 4.0 | 55 | 191 | 56 |
| 5.0 | 60 | 198 | 54 |
| 6.0 | 65 | 205 | 52 |

The computed L* values are fit with a second order polynomial function using a least squares fitting algorithm. In this calculation, the darkness setting is the independent variable and the computed L* is the dependent response variable. The fitted function is then used to determine a target electrophotographic darkness setting, with values ranging from 1.0–6.5, that should produce an L* value equal to the target nominal value. Since the laser power and developer bias setpoints are simplelinear function s of the electrophotographic darkness settings, the desired Lpow and Dev_pwm setpoints are easily determined from the target electrophotographic darkness setting.

Figure 5:
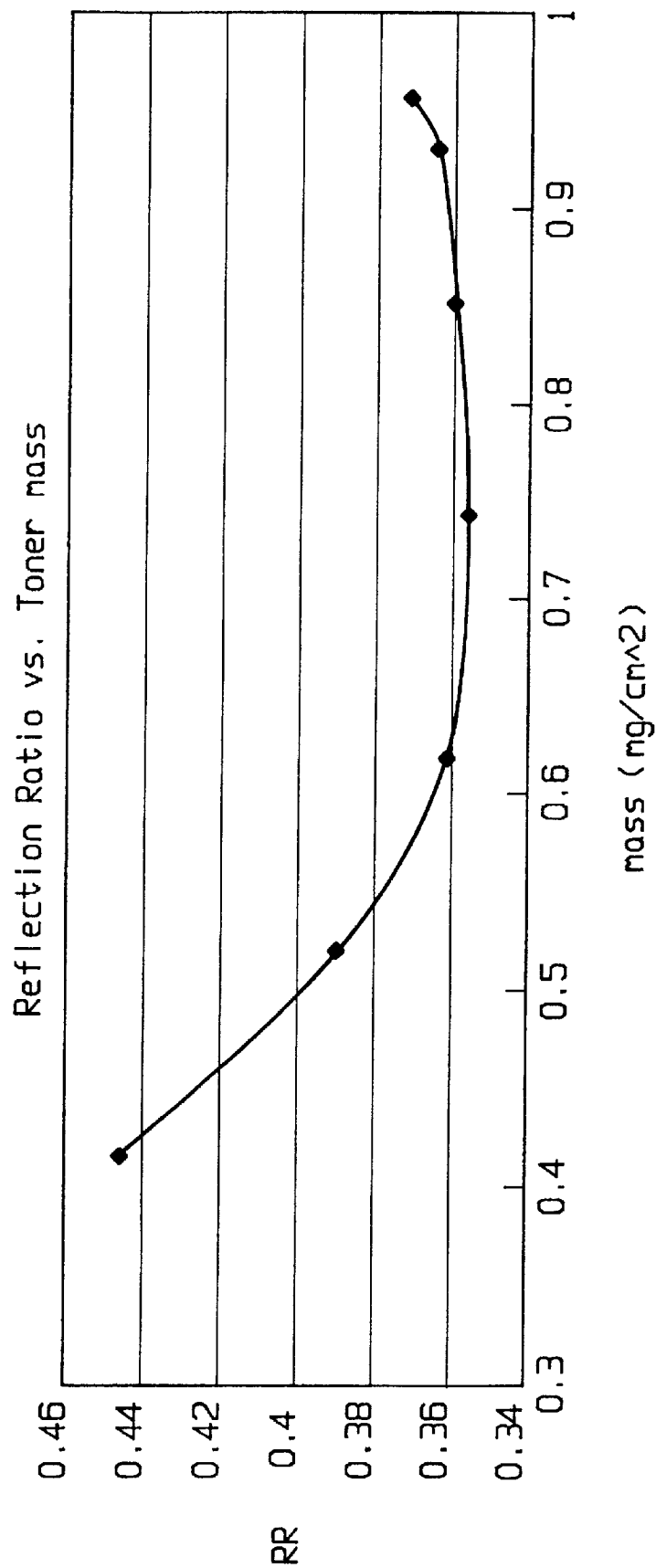
FIG. 5 is a plot of the reflection ratio versus toner mass for a series of black toner patches.

The opaque nature of black toner (pigmented with carbon black) causes a loss of sensitivity in the reflection signal as the toner coverage increases above one monolayer. FIG. 5 is a plot of the reflection signal from a series of black toner patches. The reflection ratio plotted on the vertical axis is the ratio of the sensor voltage for a black toner patch divided by the sensor voltage for the bare intermediate belt. The reflection ratio decreases with additional toner mass below 0.6 mg/cm$^2$, but bottoms out around 0.75 mg/cm$^2$ and increases slightly beyond that point. The low slope and inflection near the target mass density makes it impossible to reliably control the black toner density on the intermediate belt surface.

In order to set the electrophotographic conditions appropriately for black toner, six test patches are put on intermediate transfer belt 36 with six electrophotographic conditions that are all much lower than the target condition. The electrophotographic conditions include laser power (exposure energy), developer roll bias voltage, gamma correction and/or halftone linearization. These six patches are preferably formed so that the density of the patches range from 0.2 to 0.5 mg/cm$^2$. The reflection signal from each patch is obtained by averaging multiple sample measurements of the toner patch sensor voltage. Each reflection signal is then converted into a reflection ratio by comparing it to a reflection signal taken with no toner on the same region of intermediate belt 36. The reflection ratio for each test patch is converted into a predicted L* or lightness value for the fused patch using empirically derived equations. The predicted L* value is the lightness value one would expect to measure if the toner patch was transferred to paper and fused. The six predicted L* values obtained in this manner are then fit to an exponential function as described below. This function is then used project L* values beyond the tested conditions and allows more accurate image density control for black toner on intermediate transfer belt 36. The specific mathematical form fit to the data is:

$$y=A*e^{-Bx}+C,$$

where y is the target L* of the black toner; x is the indicator of where laser power and/or developer bias should be set. The laser power and the developer bias are both simple linear functions of the variable x. In this algorithm, the lower laser power and/or developer bias settings are given more weight than the latter ones. This weighting allows data that may have come from saturated patches to have less bearing on the final answer. The asymptote C is fixed empirically and ensures the curve will fall to a reasonable L* value even if the darker data does not.

In order to do a linear least squares fit of the data to the curve, the original function $y=A*e^{-Bx}+C$ is manipulated in the following way and then converted back to desired numbers. Given $y=A*e^{-Bx}+C$, taking the natural logarithm of both sides produces the following equation:

$$ln(y-C)=ln\,A-Bx.$$

Now letting ln(y−C)=z, ln A=k1 and −B=k2, leads to the following equation:

$$z=k1+k2x.$$

Hence, k1 and k2 can be solved for with z given and the linear least squares fit can be performed.

Figure 6:
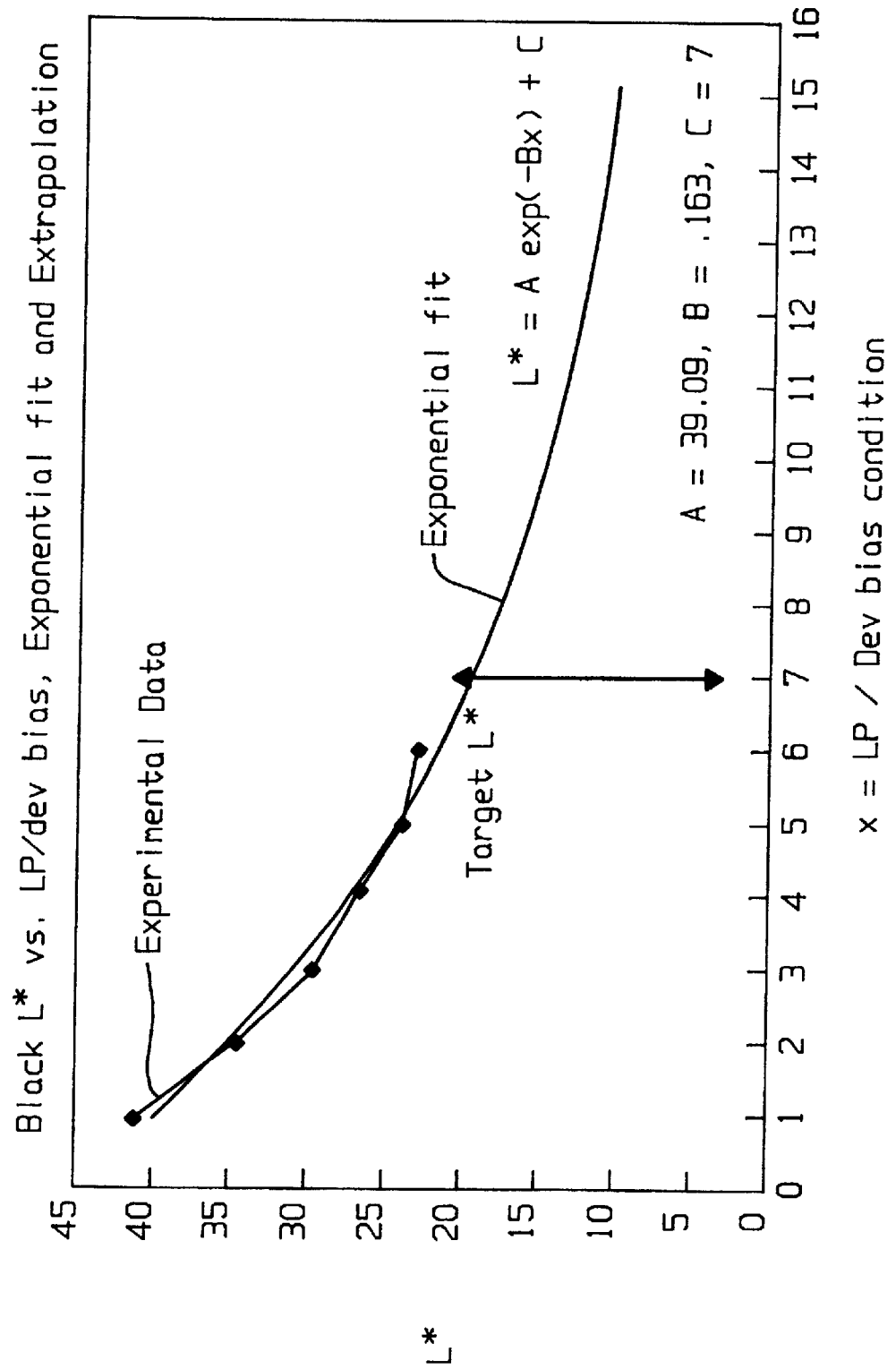
FIG. 6 is a plot of black L* versus laser power/developer bias.

The resulting x value is then translated into a laser power/developer bias setting for the target L*. FIG. 6 is an example of a set of six points plotted. Then the exponential curve is fitted to the data as described above. For this example, an extrapolated value of x=6.8 would be chosen for an L* target of 20, as indicated on the chart. Experimentation has shown that this method works better than choosing the laser power and developer bias conditions based on the measured reflection ratios near the target toner density.

Toner patch sensor 56 also provides an opportunity for closed loop control of the operating points used in toner saver modes. Since toner patch sensor 56 provides closed loop control, it can compensate for the variability that is normally caused by variations in printers, cartridges and environments. Toner patch sensor 56 can be used to determine the operating points that are needed to operate in toner saver modes.

During a density check or calibration procedure as described above, the system prints and evaluates test patterns at a variety of operating points in order to determine what operating point is needed to get the correct colors in nominal printing modes. In order to be used for finding operating points for toner saver modes, the same basic procedure can be used, but the target values for predicted image densities are reduced. For example, image density targets of 85%, 70% or 50% of the nominal print requirements might be used. Since the operating points are generated with closed loop control, the actual toner savings are much more consistent than on printers that use open loop control.

In one embodiment, toner saver operating points provide five different levels of black toner usage:

1) 110% of nominal black toner usage (target L*=19)
2) nominal black toner usage (target L*=20)
3) 85% of nominal black toner usage (target L*=22)
4) 70% of nominal black toner usage (target L*=25)
5) 50% of nominal black toner usage (target L*=30).

The toner patch sensor control algorithms take the reflectance signals and use them to predict the darkness (L*) that would be measured with a spectrophotometer if the test patches were transferred to paper and fused. For each level of toner usage, toner patch sensor 56 uses a different target L* value in computing the required combination of laser power and developer bias.

To extend this procedure to the black toner saver modes, the fitted function is used repeatedly to predict a series of target electrophotographic darkness settings. From these values a series of laser power and developer bias conditions are determined that should produce black L* values close to the target L* values associated with each of the toner usage modes described above.

In the above-described alternative fitting function for black, the test conditions are modified to always produce L* values greater than the target nominal value. The data is then fit to an exponential function, and the function is extrapolated down to the nominal target L* value. This extrapolation method deals with a poorly understood behavior of the black reflectance signal, i.e., the reflectance signal for black toner patches decreases to a minimum value as the patches approach an L*=20 and then shows a slight increase at higher darkness conditions. Ideally, the black reflectance signal would show a monotonic decrease as the thickness of the toner patches increase and the L*'s of the patches decrease.

When a black only toner saver setting is selected through the front panel of the printer, the printer uses the Lpow and Dev_pwm settings computed during the color calibration procedure which correspond to the desired target L* (toner usage) for black only printing. Color print jobs use the laser power and developer bias settings appropriate for the nominal target L* values.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of calibrating a multi-color electrophotographic machine having an image bearing surface, said method comprising the steps of:
   superimposing toner patches of each of a plurality of non-black colors on the image-bearing surface to thereby form a multi-layer test toner patch;
   emitting light onto said multi-layer toner patch;
   measuring an amount of light that is reflected off of said multi-layer toner patch;
   emitting light onto a bare section of the image-bearing surface, the bare section having substantially no toner thereon;
   measuring an amount of light that is reflected off of the bare section; and
   adjusting at least one electrophotographic condition, said adjusting being dependent upon each of said measuring steps.

2. The method of claim 1, wherein each of said emitting and measuring steps are performed with a toner patch sensor.

3. The method of claim 1, wherein said adjusting step is performed independently for each of the colors of the multi-color electrophotographic machine.

4. The method of claim 1, wherein the image-bearing surface comprises an intermediate transfer medium.

5. The method of claim 1, wherein said toner patches comprise solid area toner patches.

6. The method of claim 1, comprising the further steps of:
   forming at least one single color solid area toner patch on the image-bearing surface;
   emitting light onto said single color solid area toner patches; and
   measuring an amount of light that is reflected off of said at least one single color solid area toner patch, wherein said adjusting step is dependent upon the amount of light that is reflected off of said at least one single color solid area toner patch.

7. The method of claim 6, wherein said at least one single color solid area toner patch comprises a plurality of single color solid area toner patches formed at various electrophotographic conditions.

8. The method of claim 1, wherein said at least one electrophotographic condition comprises at least one of a laser power, a developer bias, a gamma correction and a halftone linearization.

9. The method of claim 1, wherein said plurality of non-black colors is at least three non-black colors.

10. The method of claim 1, wherein said plurality of non-black colors is only non-black colors.

11. The method of claim 1, comprising the further steps of:
    creating at least two single layer non-black toner patches;
    emitting light onto said at least two single layer non-black toner patches;
    measuring an amount of light that is reflected off of said at least two single layer non-black toner patches; and
    combining information for said multi-layer toner patch and said at least two single layer non-black toner patches for adjusting at least one electrophotographic condition for at least one color plane.

12. A method of calibrating a multi-color electrophotographic machine having an image bearing surface, said method comprising the steps of:
    superimposing toner patches of each of a plurality of colors on the image-bearing surface to thereby form a multi-layer test toner patch;
    emitting light onto said multi-layer toner patch;
    measuring an amount of light that is reflected off of said multi-layer toner patch;
    emitting light onto a bare section of the image-bearing surface, the bare section having substantially no toner thereon;
    measuring an amount of light that is reflected off of the bare section;
    adjusting at least one electrophotographic condition, said adjusting being dependent upon each of said measuring steps; and
    repeating said superimposing step, said emitting steps and said measuring steps after a change in a reflectivity of the image bearing surface occurs, said adjusting step being dependent upon said repeated measuring steps.

13. The method of claim 12, comprising the further steps of:
    calculating a first mathematical relationship between the amount of light that is reflected off of said multi-layer toner patch before the change in reflectivity of the image bearing surface and the amount of light that is reflected off of the bare section before the change in reflectivity of the image bearing surface; and
    calculating a second mathematical relationship between the amount of light that is reflected off of said multi-layer toner patch after the change in reflectivity of the image bearing surface and the amount of light that is reflected off of the bare section after the change in reflectivity of the image bearing surface, said adjusting step being dependent upon each of the first mathematical relationship and the second mathematical relationship.

14. The method of claim 13, wherein said first mathematical relationship comprises a first ratio of the amount of light that is reflected off of said multi-layer toner patch before the change in reflectivity of the image bearing surface to the amount of light that is reflected off of the bare section before the change in reflectivity of the image bearing surface, said second mathematical relationship comprising a second ratio of the amount of light that is reflected off of said multi-layer toner patch after the change in reflectivity of the image bearing surface to the amount of light that is reflected off of the bare section after the change in reflectivity of the image bearing surface.

15. A method of calibrating a multi-color electrophotographic machine having an image bearing surface, said method comprising the steps of:

superimposing toner patches of each of a plurality of colors on the image-bearing surface to thereby form a multi-layer test toner patch, the plurality of colors including cyan, magenta and yellow;

emitting light onto said multi-layer toner patch;

measuring an amount of light that is reflected off of said multi-layer toner patch;

emitting light onto a bare section of the image-bearing surface, the bare section having substantially no toner thereon;

measuring an amount of light that is reflected off of the bare section; and adjusting at least one electrophotographic condition, said adjusting being dependent upon each of said measuring steps.

16. A method of calibrating a multi-color electrophotographic machine having an image bearing surface, said method comprising the steps of:

superimposing toner patches of each of a plurality of colors on the image-bearing surface to thereby form a multi-layer test toner patch;

emitting light onto said multi-layer toner patch;

measuring an amount of light that is reflected off of said multi-layer toner patch; emitting light onto a bare section of the image-bearing surface, the bare section having substantially no toner thereon;

measuring an amount of light that is reflected off of the bare section, wherein each of said emitting and measuring steps are performed with a toner patch sensor;

adjusting at least one electrophotographic condition, said adjusting being dependent upon each of said measuring steps; and reducing a gain of said toner patch sensor before measuring the amount of light that is reflected off of said multi-layer toner patch.

17. A method of calibrating a multi-color electrophotographic machine having an image bearing surface, said method comprising the steps of:

superimposing toner patches of each of a plurality of colors on the image-bearing surface to thereby form a multi-layer test toner patch;

emitting light onto said multi-layer toner patch;

measuring an amount of light that is reflected off of said multi-layer toner patch;

emitting light onto a bare section of the image-bearing surface, the bare section having substantially no toner thereon;

measuring an amount of light that is reflected off of the bare section; and adjusting at least one electrophotographic condition, said adjusting being dependent upon each of said measuring steps, said adjusting step being performed independently for each of the colors of the multi-color electrophotographic machine, said adjusting step being performed by using at least one lookup table relating results of said measuring steps with at least one of a desired laser power and a desired developer bias for each of the colors of the multi-color electrophotographic machine.

18. A method of calibrating a multi-color electrophotographic machine having an image bearing surface, said method comprising the steps of:

superimposing toner patches of each of a plurality of colors on the image-bearing surface to thereby form a multi-layer test toner patch;

emitting light onto said multi-layer toner patch;

measuring an amount of light that is reflected off of said multi-layer toner patch;

emitting light onto a bare section of the image-bearing surface, the bare section having substantially no toner thereon;

measuring an amount of light that is reflected off of the bare section; and adjusting at least one electrophotographic condition, said adjusting being dependent upon each of said measuring steps, said adjusting step being performed independently for each of the colors of the multi-color electrophotographic machine, said adjusting step being performed by calculating a saturation reflection ratio for each of the colors of the multi-color electrophotographic machine.

19. A method of calibrating a multi-color electrophotographic machine having an intermediate transfer belt, said method comprising the steps of:

superimposing toner patches of each of a plurality of colors on the intermediate transfer belt to thereby form a multi-layer test toner patch;

emitting light onto said multi-layer toner patch;

measuring an amount of light that is reflected off of said multi-layer toner patch;

emitting light onto a bare section of the intermediate transfer belt, the bare section having substantially no toner thereon;

measuring an amount of light that is reflected off of the bare section; and adjusting at least one electrophotographic condition, said adjusting being dependent upon each of said measuring steps.

20. A method of calibrating an electrophotographic machine having an image bearing surface, said method comprising the steps of:

determining at least one of a minimum possible desired laser power value and a minimum possible desired developer bias value;

creating a plurality of toner patches on the image bearing surface using at least one of a plurality of low laser power values below said minimum possible desired laser power value and a plurality of low developer bias values below said minimum possible desired developer bias value;

emitting light onto said toner patches;

measuring an amount of light that is reflected off of each of said toner patches;

emitting light onto a bare section of the image-bearing surface, the bare section having substantially no toner thereon;

measuring an amount of light that is reflected off of the bare section; and adjusting at least one of an actual laser power and an actual developer bias dependent upon each of said measuring steps.

21. The method of claim 20, wherein said adjusting step includes the substeps of:

calculating a respective reflection ratio for each of said toner patches dependent upon each of said measuring steps;

converting each of said reflection ratios into a predicted lightness value; and estimating at least one of a desired laser power and a desired developer bias needed to achieve a desired lightness value, said estimating being dependent upon said predicted lightness values and at least one of said low laser power values and said low developer bias values.

22. The method of claim 21, wherein said estimating step includes:

fitting said predicted lightness values and at least one of said low laser power values and said low developer bias values to an exponential function; and using said exponential function to ascertain said at least one of a desired laser power and a desired developer bias needed to achieve said desired lightness value.

23. The method of claim 21, wherein said reflection ratios comprise ratios between the amounts of light that are reflected off of said toner patches and the amount of light that is reflected off of the bare section.

24. The method of claim 21, wherein each of said predicted lightness values comprises a lightness value expected if a corresponding said toner patch were to be transferred to paper and fused.

25. The method of claim 20, wherein the image-bearing surface comprises an intermediate transfer medium.

26. A method of calibrating an electrophotographic machine having an image bearing surface, said method comprising the steps of:

creating a plurality of toner patches on the image-bearing surface, each said toner patch being created with at least one of a different test laser power value and a different test developer bias value;

emitting light onto said toner patches;

measuring an amount of light that is reflected off of each of said toner patches;

emitting light onto a bare section of the image-bearing surface, the bare section having substantially no toner thereon;

measuring an amount of light that is reflected off of the bare section; and determining at least one of a plurality of actual laser power values and a plurality of actual developer bias values for use in conjunction with respective levels of toner consumption, said determining being dependent upon each of said measuring steps.

27. The method of claim 26, wherein said determining step includes the substeps of:

calculating a respective reflection ratio for each of said toner patches dependent upon each of said measuring steps;

converting each of said reflection ratios into a predicted lightness value; and estimating at least one of a desired laser power and a desired developer bias needed to achieve a desired lightness value with a corresponding rate of toner consumption, said estimating being dependent upon said predicted lightness values and at least one of said test laser power values and said test developer bias values.

28. The method of claim 27, wherein said estimating step includes:

fitting said predicted lightness values and at least one of said test laser power values and said test developer bias values to an exponential function; and using said exponential function to ascertain said at least one of a desired laser power and a desired developer bias needed to achieve said desired lightness value.

29. The method of claim 27, wherein said reflection ratios comprise ratios between the amounts of light that are reflected off of said toner patches and the amount of light that is reflected off of the bare section.

30. The method of claim 27, wherein each of said predicted lightness values comprises a lightness value expected if a corresponding said toner patch were to be transferred to paper and fused.

31. A method of calibrating a multi-color electrophotographic machine having an image bearing surface, said method comprising the steps of:

forming a cyan solid area toner patch on the image-bearing surface;

forming a magenta solid area toner patch on the image-bearing surface;

forming a yellow solid area toner patch on the image-bearing surface;

forming at least one superimposed, multi-layer toner patch of at least two of cyan, magenta and yellow on the image-bearing surface;

emitting light onto each of said toner patches;

measuring an amount of light that is reflected off of each of said toner patches;

emitting light onto a bare section of the image-bearing surface, the bare section having substantially no toner thereon;

measuring an amount of light that is reflected off of the bare section;

changing at least one of a laser power and a developer bias;

measuring an amount of light that is reflected off of at least one of said solid area toner patches;

repeating said changing step and said step of measuring an amount of light that is reflected off of at least one of said solid area toner patches; and adjusting at least one of the laser power and the developer bias dependent upon each of said measuring steps.

* * * * *